(12) United States Patent
Ozkan et al.

(10) Patent No.: US 12,057,575 B2
(45) Date of Patent: Aug. 6, 2024

(54) SULFUR-SILICON CELL AND METHODS

(71) Applicant: The Regents of the University of California, Oakland, CA (US)

(72) Inventors: Cengiz S. Ozkan, San Diego, CA (US); Mihrimah Ozkan, San Diego, CA (US); Jeffrey Bell, Northridge, CA (US); Rachel Ye, Riverside, CA (US)

(73) Assignee: THE REGENTS OF THE UNIVERSITY OR CALIFORNIA, Oakland, CA (US)

(*) Notice: Subject to any disclaimer, the term of this patent is extended or adjusted under 35 U.S.C. 154(b) by 326 days.

(21) Appl. No.: 16/627,137

(22) PCT Filed: Jun. 29, 2018

(86) PCT No.: PCT/US2018/040322
§ 371 (c)(1),
(2) Date: Dec. 27, 2019

(87) PCT Pub. No.: WO2019/006319
PCT Pub. Date: Jan. 3, 2019

(65) Prior Publication Data
US 2020/0161648 A1  May 21, 2020

Related U.S. Application Data

(60) Provisional application No. 62/527,884, filed on Jun. 30, 2017.

(51) Int. Cl.
| | | |
|---|---|---|
| *H01M 4/134* | (2010.01) | |
| *H01M 4/136* | (2010.01) | |
| *H01M 4/1395* | (2010.01) | |
| *H01M 4/36* | (2006.01) | |
| *H01M 4/38* | (2006.01) | |
| *H01M 4/60* | (2006.01) | |

(Continued)

(52) U.S. Cl.
CPC ........... *H01M 4/386* (2013.01); *H01M 4/134* (2013.01); *H01M 4/136* (2013.01); *H01M 4/366* (2013.01); *H01M 4/382* (2013.01); *H01M 4/602* (2013.01); *H01M 4/625* (2013.01); *H01M 10/0525* (2013.01); *H01M 10/0585* (2013.01)

(58) Field of Classification Search
None
See application file for complete search history.

(56) References Cited

U.S. PATENT DOCUMENTS

| | | |
|---|---|---|
| 2011/0111294 A1 | 5/2011 | Lopez et al. |
| 2011/0177398 A1 | 7/2011 | Affinito et al. |

(Continued)

FOREIGN PATENT DOCUMENTS

WO    WO-2015114692 A1 *  8/2015  ........ H01M 10/0525

OTHER PUBLICATIONS

MTI 2032 coin case website (Year: 2017).*

(Continued)

*Primary Examiner* — Yoshitoshi Takeuchi
(74) *Attorney, Agent, or Firm* — SCHWEGMAN LUNDBERG & WOESSNER, P.A.

(57) ABSTRACT

A silicon and sulfur battery and methods are shown. In one example, the silicon and sulfur battery includes a lithium chip coupled to a silicon electrode. In some examples, the silicon electrode is formed from silicon nanoparticles and carbon.

10 Claims, 14 Drawing Sheets

(51) Int. Cl.
  *H01M 4/62* (2006.01)
  *H01M 10/0525* (2010.01)
  *H01M 10/0585* (2010.01)

(56) References Cited

U.S. PATENT DOCUMENTS

| | | | |
|---|---|---|---|
| 2012/0067737 A1 | 3/2012 | Zhang | |
| 2012/0164539 A1 | 6/2012 | Zhamu et al. | |
| 2013/0271085 A1* | 10/2013 | Chen | H01M 4/1393 429/188 |
| 2014/0370378 A1 | 12/2014 | Liu | |
| 2016/0111721 A1* | 4/2016 | Xiao | H01M 4/0471 427/126.3 |
| 2016/0126543 A1* | 5/2016 | Ota | H01M 4/1393 429/231.95 |
| 2017/0012282 A1* | 1/2017 | Kondo | H01M 10/0525 |

OTHER PUBLICATIONS

MTI lithium chip website (Year: 2017).*
International Application Serial No. PCT/US2018/040322, International Search Report mailed Nov. 2, 2018, 4 pgs.
International Application Serial No. PCT/US2018/040322, Invitation to Pay Additional Fees and Partial Search Report mailed Aug. 31, 2018, 2 pgs.
International Application Serial No. PCT/US2018/040322, Written Opinion mailed Nov. 2, 2018, 5 pgs.
Takahashi, et al., "A sulfur-microporous carbon composite positive electrode for lithium-sulfur and silicon-sulfur rechargeble batteries", Progress in Natural Science Materials International, Entire Document, 25(6), [Online] Retrieved from the internet: <https://www.sciencedirect.com/science/article/pii/S100200711500129X>, (2015), 10 pgs.
International Application Serial No. PCT/US2018/040322, International Preliminary Report on Patentability mailed Jan. 9, 2020, 7 pgs.

* cited by examiner

SULFUR-SILICON CELL AND METHODS

CROSS REFERENCE TO RELATED APPLICATIONS

This application is a U.S. National Stage Filing under 35 U.S.C. 371 from International Application No. PCT/US2018/040322, on Jun. 29, 2018, and published as WO 2019/006319 A1 on Jan. 3, 2019, which claims the benefit of priority to U.S. Patent. Provisional Application No. 62/527,884, filed Jun. 30, 2017, each of which is incorporated by reference herein in its entirety.

TECHNICAL FIELD

This invention relates to battery cell devices and methods. In one example, this invention relates to lithium ion batteries.

BACKGROUND

Improved batteries, such as lithium ion batteries are desired. New materials and microstructures are desired to increase capacity, and to mitigate issues with volumetric expansion and contractions in electrode materials.

DETAILED DESCRIPTION

Figure 1A:
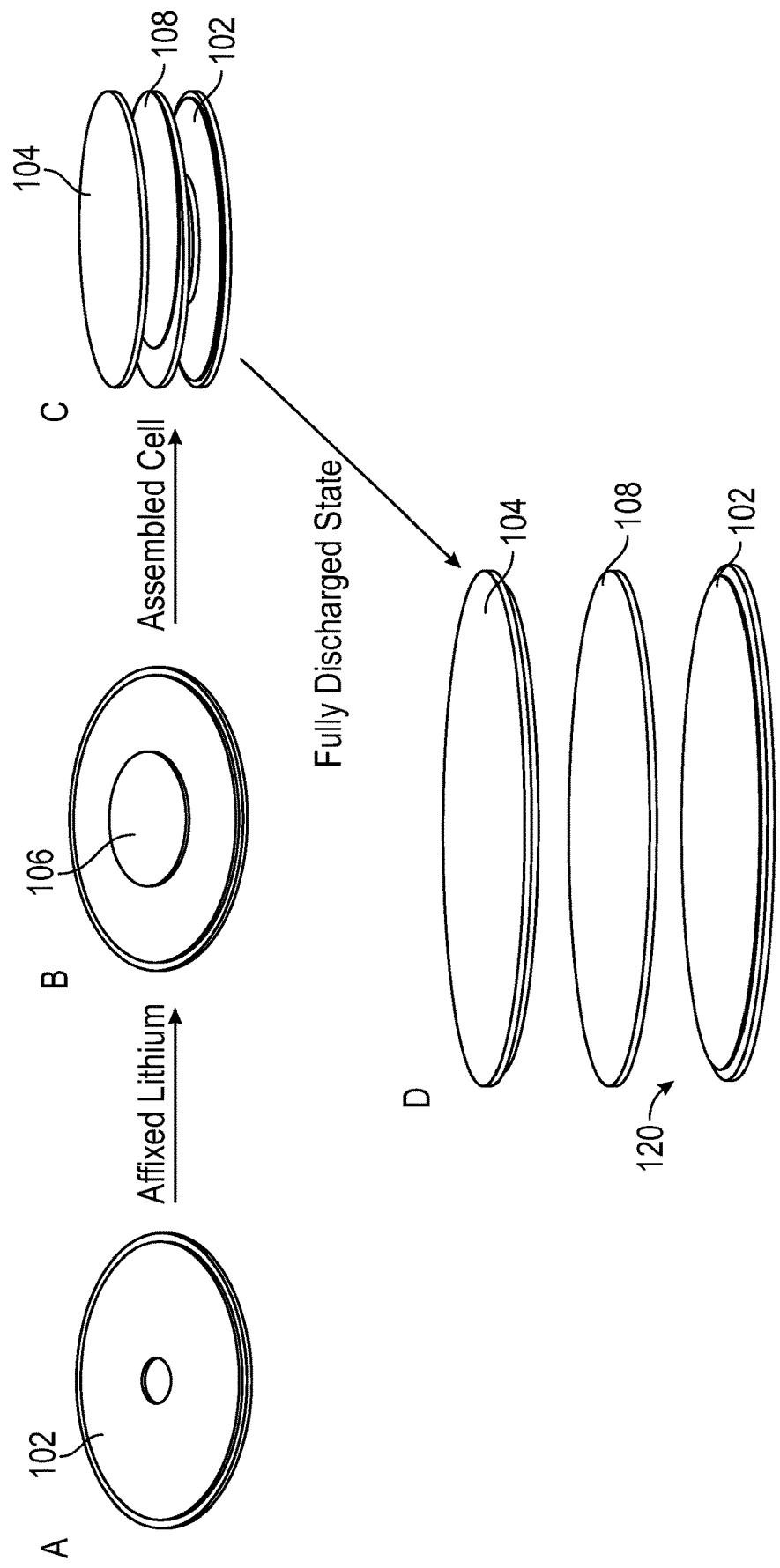
FIG. 1A shows a battery architecture according to an example of the invention.

In the following detailed description, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

An increase in demand for longer lasting batteries has turned researchers towards sulfur and silicon based batteries owing to their high energy density, low cost, and abundance of material. Conventional lithium-ion batteries rely on the cathode as the source of lithium; as such, a typical sulfur-silicon battery system requires a lithiated form of silicon or lithium sulfide. However, lithium sulfide is extremely hazardous, and both materials are air sensitive, and require specialized facilities to process. As a result, researchers have sought alternatives to a prelithiated sulfur-silicon full cell that provide feasibility in manufacturing. Here we present a novel battery architecture synthesized via unique electrode placement with a lithium source to bypass problems that currently inhibit the advancement of sulfur and silicon based full-cells. In this paper, we highlight the potential of this unique full cell along with its viability by investigating its unique chemistry through various electrochemical techniques.

Lithium-ion batteries (LiBs) outperform other battery technologies on the market, making them the choice for consumer electronics and electric vehicles (EVs). However, performance and cost demands have begun exceeding the capabilities of current LiB technology. Researchers have turned towards next generation battery materials to procure cheaper, higher capacity batteries.

Current LiBs utilize a cathode made from lithiated metal oxides, such as lithium nickel manganese cobalt oxide (NMC). The cathode is traditionally countered by a graphite anode, although some in the industry have recently started incorporating silicon into the anode (1%-5%). The advantages to this combination are high rate capabilities, low capacity degradation, and long lifetime. The disadvantages are a limited energy density, with NMC/Graphite having the highest theoretical energy density at 605 Wh/kg, and high cost of \$180/kWh. To reduce costs, researchers have turned toward more energy dense and cheaper materials.

Sulfur is an attractive cathode material due to its theoretical capacity of 1675 mAh/g. However, implementation of sulfur has been slow due to its inherent problems including polysulfide shuttling, volumetric expansion, and poor conductivity. Polysulfide shuttling results from higher order polysulfides dissolving in the electrolyte, causing long term capacity degradation and slowing reaction kinetics during runtime. Volumetric expansion results from sulfur expanding (80%) during lithiation/delithiation which causes mechanical degradation to the electrode's conductive network. Finally, sulfur's insulating properties affect the electrode's rate capabilities. Fortunately, researchers have discovered methods to alleviate these issues ranging from mechanical barriers, to porous carbon networks, to other chemical methods. Promising performance from these solutions have resulted in much fervor surrounding sulfur.

The current anode of choice is silicon for its high theoretical capacity of 4200 mAh/g. Silicon faces two challenges—poor conductivity, and volumetric expansion. During lithiation/delithiation, silicon's volume changes 400% which mechanically pulverizes the electrode, and degrades its cycle life and rate capabilities. To alleviate these issues, researchers utilize novel methods including nano silicon structures, conductive additives, and binders. Ultimately, the immense focus on solving each electrode's issues has resulted in less research effort on combining a sulfur cathode and silicon anode in a full-cell configuration.

A full cell using sulfur and silicon electrodes is attractive for several reasons. Sulfur and silicon are environmentally benign and abundant. Furthermore, theoretical energy density of a sulfur silicon full-cell (SSFCs) is 1982 Wh/kg, far exceeding the theoretical energy density of current LiBs while only potentially costing \$13/kWh. However, a major restriction for SSFCs is the lithium source. Currently, researchers utilize pre-lithiated materials such as lithium sulfide or lithium silicide, yet these materials require specialized equipment and face restrictions in processing.

Here, we present a novel LiB architecture utilizing a sulfur cathode and silicon anode with lithium source integrated into the Si anode that can bypass these issues. The SSFC exhibits an energy density of 350 Wh/kg for 260 cycles at C/10. To the best of our knowledge, an SSFC with this architecture has not been reported.

Electrodes for SSFCs were constructed using a facile process. Shown in FIGS. 1A and 1B, the silicon electrode is patterned to create an access point for the lithium chip to make contact with the current collector. The access point allows the silicon slurry and lithium chip to act as one electrode, creating a complete circuit, allowing current to travel through the lithium. The patterned silicon electrode is engineered to only expose a small surface area of the current collector, thereby maximizing silicon slurry loading, causing only a small area of the lithium chip to make direct contact with the current collector.

Each SSFC requires roughly 6.44 mg of lithium, accounting for the lithiation of sulfur and silicon, along with SEI lithium consumption. To ensure enough lithium is available in the system, each cell is loaded with 8 mg of lithium. Lithium not making direct contact with the current collector (non-participating lithium) requires repeated cycling to slowly integrate lithium ions into the system. A detailed schematic of the constructed SSFCs is shown in FIGS. 1A and 1B.

Figure 1B:
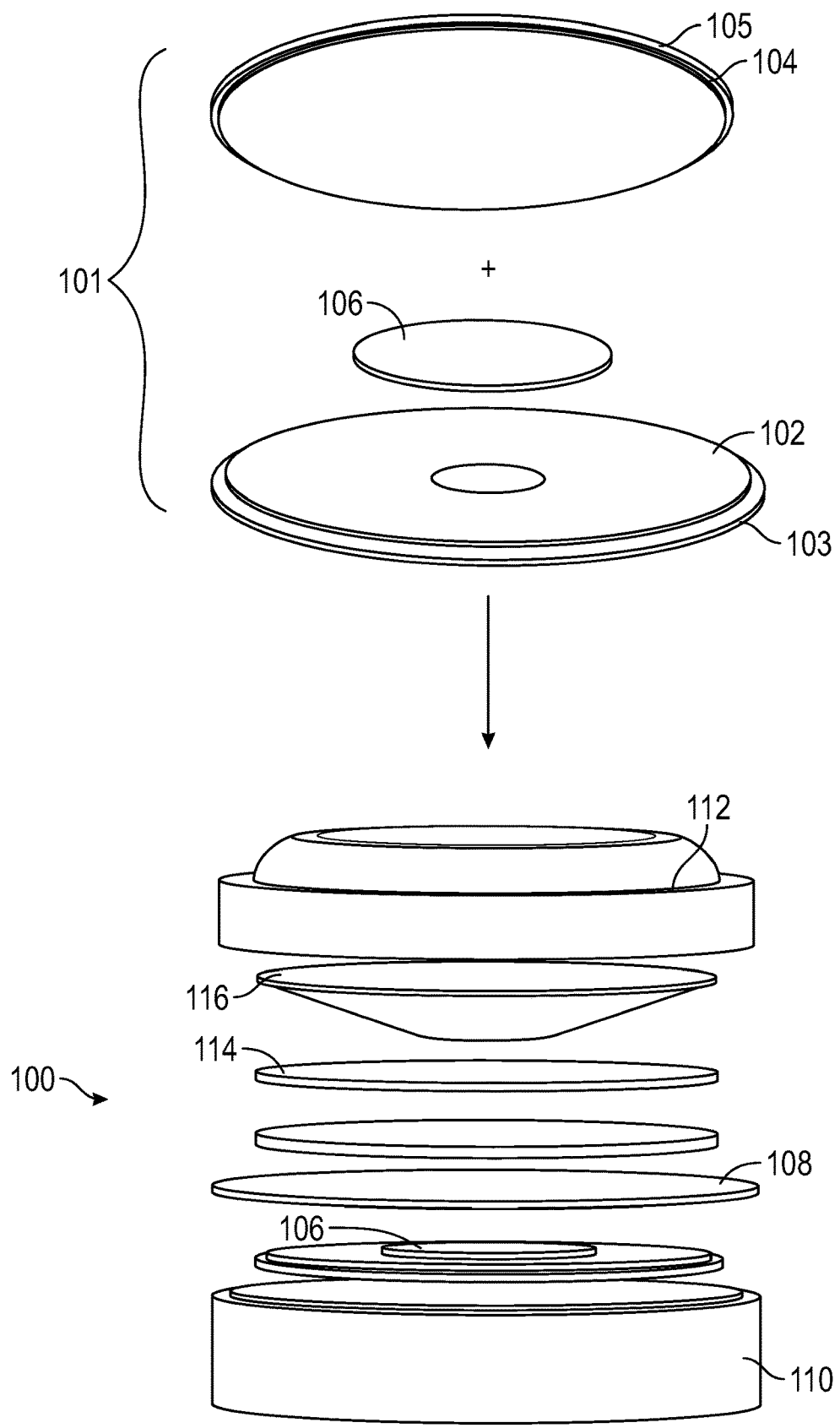
FIG. 1B shows another battery architecture according to an example of the invention.

FIG. 1B shows an exploded view of a pair of electrodes 101, and their incorporation into a battery 100. A cathode 102, and an anode 104 are shown as described in the present disclosure. A lithium chip 106 is shown. In some views in FIGS. 1A and 1B, the lithium chip 106 vis coupled to the cathode 104. In FIG. 1B, a separator 108 (such as a microporous polymer) is shown between the cathode 102 and the anode 104.

In one example, the cathode 102 includes a layer of silicon nanoparticles. In one example, the layer of silicon nanoparticles is layered on a copper substrate 103. In one example, the anode 104 includes sulfur. In one example, the anode 104 includes a sulfur containing layer on an aluminum substrate 105.

FIG. 1B further shows a spacer 114 and a spring 116, such as a Belleville spring. A bottom battery case 110 and a top battery case 112 are shown in the exploded view. As can be seen from FIGS. 1A and 1B, in one example, the lithium chip 106 occupies only a fraction of a total surface area of the layer of silicon nanoparticles on the cathode 102. As shown in the bottom of FIG. 1A, after electrochemically cycling, or otherwise conditioning the battery, the lithium chip 106 may become integrated into the microstructure of the silicon nanoparticles of the cathode 102. Because of the initial surface location of the lithium chip 106, after conditioning, it will be physically possible to detect where the lithium chip 106 started by analyzing the distribution of lithium in the microstructure of the cathode 102.

The sulfur silicon full cell consists of a sulfur electrode and a silicon anode. The sulfur electrode was made with 20 wt % Poly(acrylic acid) (PAA, 1800 g/mol, Sigma-Aldrich) and 80% wt % acetylene black sulfur composite(ABS). The aforementioned ABS was made by dissolving 200 mg of Sulfur (S, 99.998% trace metals basis, Sigma-Aldrich) in 20 ml of Dimethyl Sulfoxide (DMSO, Fisher Chemical) at 90 C, heated by a heating jacket (Brisk Heat). 129 mg of Acetylene black (Alfa aesar, 50% compressed) was then added to the solution, the solution was stirred for 3 hours before the heating jacket was removed and the solution was allowed to cool while stirring. The resulting ABS composite was then washed by anhydrous ethanol (Decon Labs, Inc.) several times to ensure the removal of DMSO and dried at 60 C for 24 hours. To make the sulfur electrode, 20% Poly(acrylic acide) (Sigma Aldrich, 450,000) and ABS were mixed with 1-Methyl-2-pyrrolidinone (NMP, Sigma-Aldrich) and then casted on a large piece of aluminum foil (Alfa Aesar, 0.025 mm thickness, 99.45% purity) by a doctor blade (MTI Automatic Thick Film Coater, BYK Doctor Blade). The casted electrode sheet was then dried in a convection oven (Cole-Parmer, Stable Temp) at 60 C for 24 hours. The silicon electrode was made with 40 wt % of commercial silicon (GNM Silicon nanoparticles 80 nm), 25% Acetylene black (Alfa aesar, 50% compressed), and 35% Poly(acrylic acide) (Sigma Aldrich, 450,000). The materials were mixed and sonicated in ethanol and then casted on a large copper foil (Alfa Aesar, 0.025 mm thickness, 99.8% purity) with a doctor blade (BYK) and was then dried at 60 C for 24 hours. Both electrodes were calendered with a 0.04 mm gap using a calendering machine (IRM) before being constructed into a coin cell.

The morphology of the electrodes was examined using SEM. The pre-cycling electrode materials are loosely packed with large void spaces existing after calendaring. Post-cycling electrode material have less void space due to the expansion of active materials and the formation of SEI products during lithiation.

To make the silicon sulfur full cell battery, a silicon electrode (16 mm in diameter) was first put inside a negative cap (MTI type 2032 coin cell case) and a piece of lithium with corresponding weight (MTI Lithium Chip 15.6 Dia× 0.25 t mm) was adhered to the top of the silicon electrode inside an Ar filled glovebox ($H_2O$<0.5 ppm, O2<0.2 ppm, Vacuum Atmosphere Co.) to form a complete circuit. Next, separators (Celgard 25 um 3501) of various sizes were placed on top to prevent any possibility of shorting. Sulfur electrode (16 mm in diameter) was then placed on top followed by two spacers, a spring, and the positive cap were added with the electrolyte in between (1:1 DOL:DME, 1 wt % $LiNO_3$, 1M LiTFSI). The battery was then sealed using a battery crimper (MTI, MSK-160D). The battery was then tested under room temperature with a Bio Logic (BCS 810 Testing Module) using different testing methods, including Galvanostatic Cycling with Potential Limitation (GCPL), Cyclic Voltammetry (CV), Potentio Electrochemical Impedance Spectroscopy (PEIS) and Galvanostatic Intermittent Titration Technique (GITT) in voltage window ranging from 1.5V to 2.6V. The same tests were also performed for the sulfur electrode (between 1.7V to 2.8V) and the silicon electrode (between 0.01V to 1V).

Electrochemical properties of the SSFC were evaluated using galvanostatic cycling with potential limitation (GCPL), cyclic voltammetry (CV), galvanostatic intermittent titration technique (GITT), electrochemical impedance spectroscopy (EIS), along with the SSFC's anode and cathode being tested individually in a half-cell format. The sulfur weight was used to determine cycling rates of the SSFC and sulfur half-cell. The Sulfur weight percentage in the Acetylene Black Sulfur composite (ABS) was measured using thermogravimetric analysis (TGA), showing 57% weight sulfur. The SSFC, which is cathode limited, and sulfur half-cell were conditioned with a current rate of 0.175 mA (C/50), and cycled at 0.875 mA (C/10). The silicon half-cell was conditioned at a current rate of 0.336mA (C/50), and cycled at 1.68 mA (C/10).

Figure 2A:
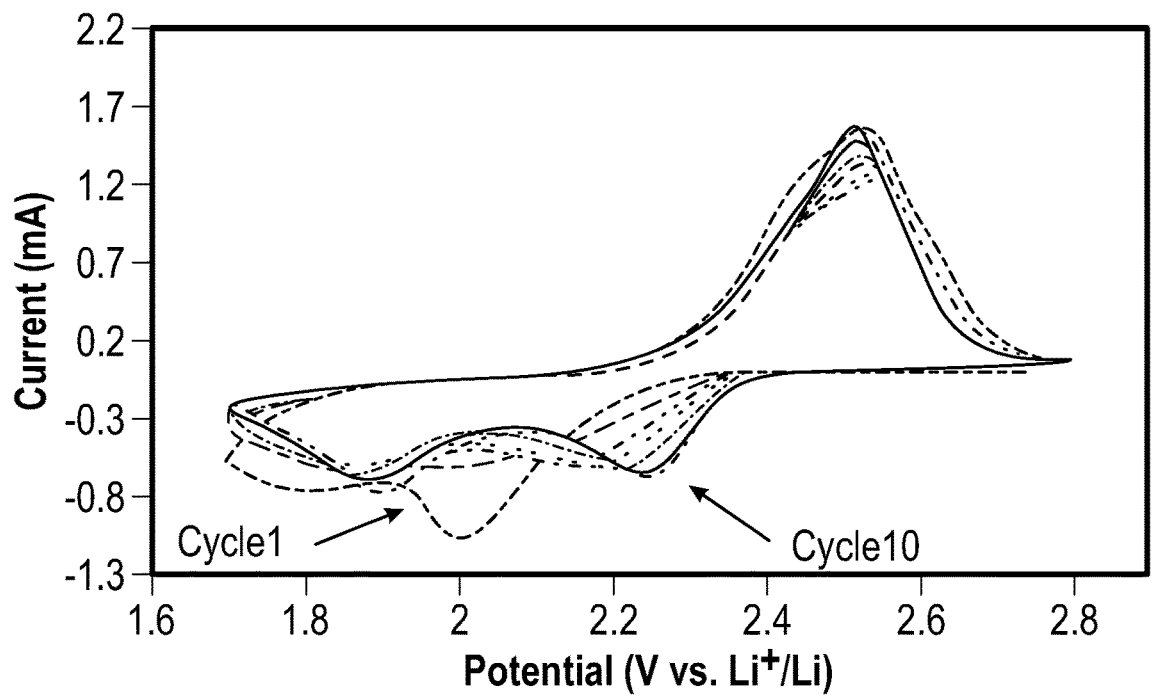
FIGS. 2A, 2B, 2C, and 2D show electrical test data of a battery according to an example of the invention.
Figure 2B:
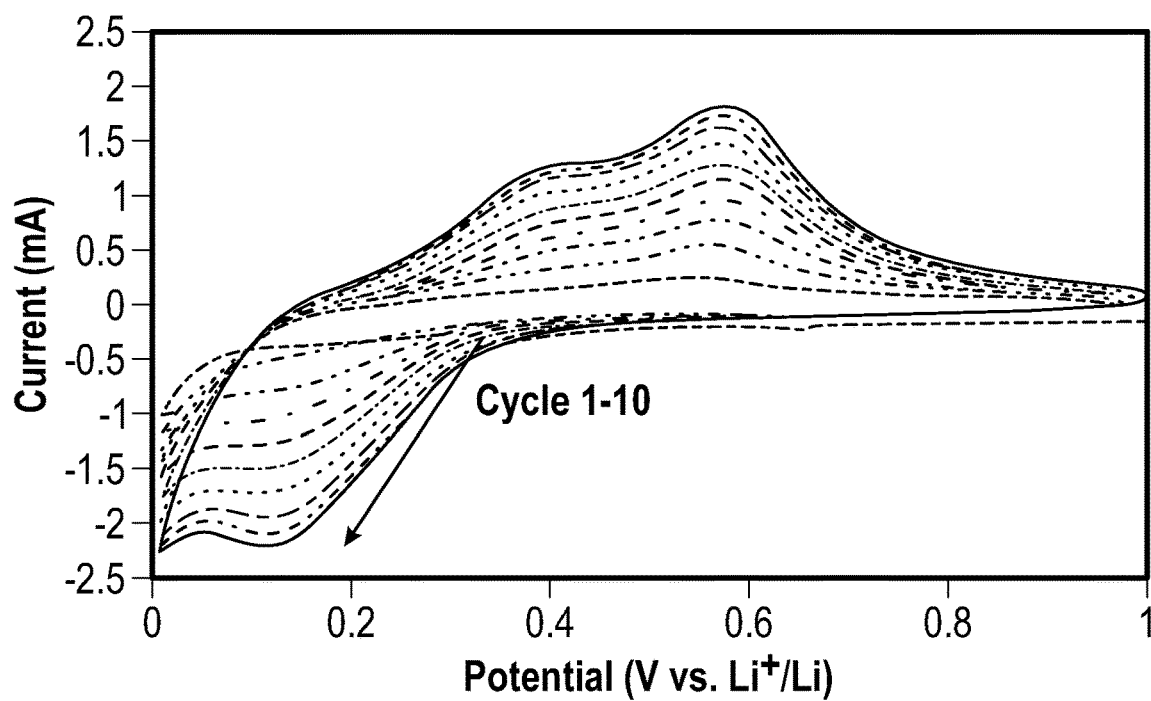

CV was performed at a scan rate of $0.1$ mV $s^{-1}$ over cycles 1-10 for both sulfur and silicon half-cells. SSFC CV was conducted at 0.05 mV $s^{-1}$ and 0.1 mV $s^{-1}$ respectively for cycles 1-2 and 300-309. A scan rate of 0.05 mV $s^{-1}$ was used to accommodate aforementioned requirements for lithium integration. FIGS. 2A and 2B show CV profiles for cycles 1-10 of sulfur and silicon half-cells respectively. Shown in FIG. 2A, the sulfur half-cell exhibits typical characteristics of chemical reactions between sulfur and lithium ions with two cathodic peaks at 1.9 V and 2.25 V followed by an anodic peak at around 2.5 V. The notable difference for cycles 1 and 2 is the offset peaks at 1.8 V and 2 V. Peaks shifting towards a higher potential indicates a higher ionic conductivity stemming from increased polysulfides and SEI formation. Shown in FIG. 2B, the silicon half-cell shows typical cathodic peaks at 0.18 V and 0.1 V with anodic peaks at 0.4 V and 0.6 V. The peaks corresponding to lithiation/delithiation increase in intensity over time, resulting from either lithiation of the native $SiO_2$ layer or lithium gaining access to additional silicon. The peak associated with SEI formation (0.67 V) does not exist after the first cycle, showing bulk SEI formation has been achieved.

Figure 2C:
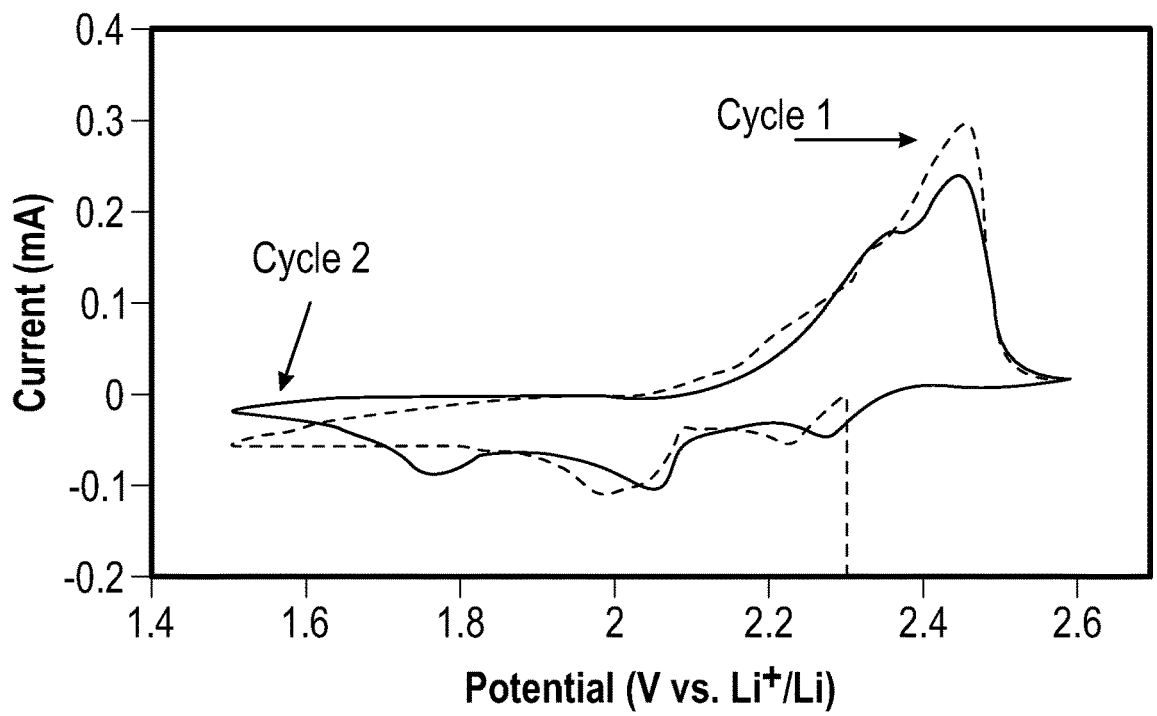
Figure 2D:
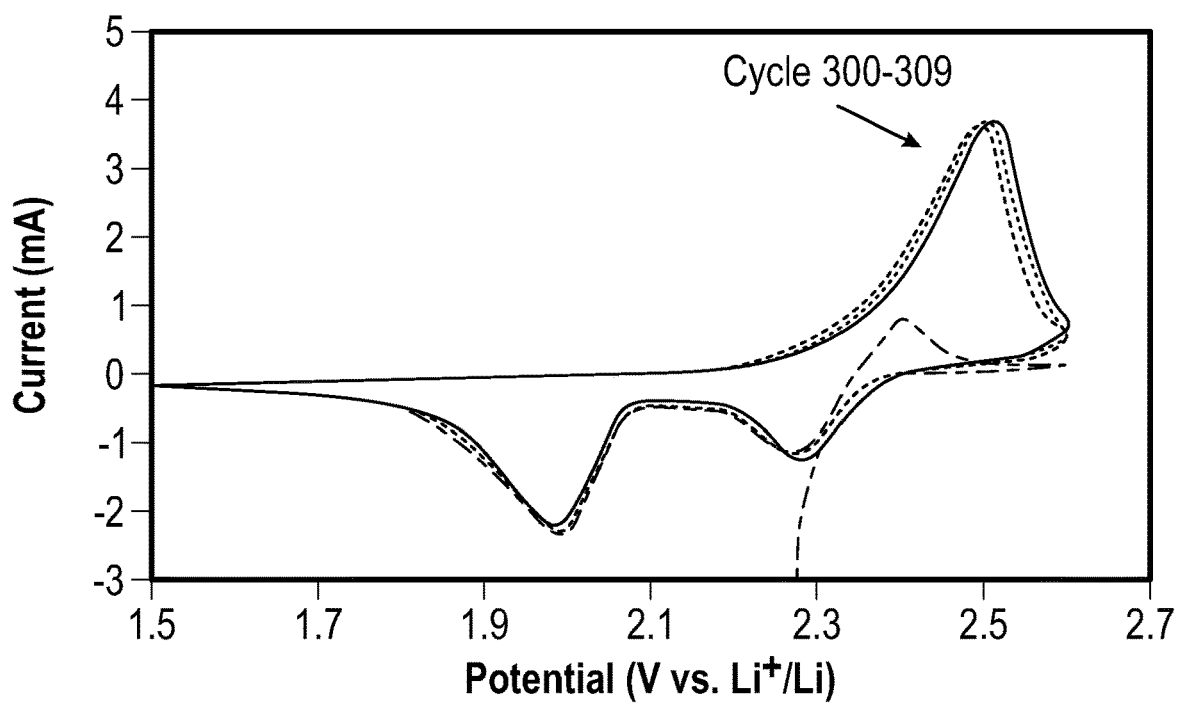

FIGS. 2C and 2D show CV profiles for the SSFC for cycles 1-2 and 300-309 respectively. FIGS. 2C and 2D exhibit a similar electrochemistry to FIG. 2A resulting from interactions between lithium ions and sulfur dominating the SSFC chemistry. In FIG. 2C, the first cycle has cathodic peaks at 2 V and 2.2 V resulting from limited amounts of lithium participating in the first discharge. Cycle two has an additional peak around 1.8 V. We hypothesize non-participating lithium's position in the system causes a negative voltage potential between lithium and silicon. The resulting equilibrium voltage will be equal to the difference between the original potential of unlithiated sulfur and lithium (~2.8 V), and the potential between silicon and lithium (~1V). The extra anodic peak at 2.35V is also caused by non-participating lithium. This causes a negative potential between lithium and silicon (~0.15 V), shifting the normal peak at 2.5 V down to 2.35 V.

Figure 4A:
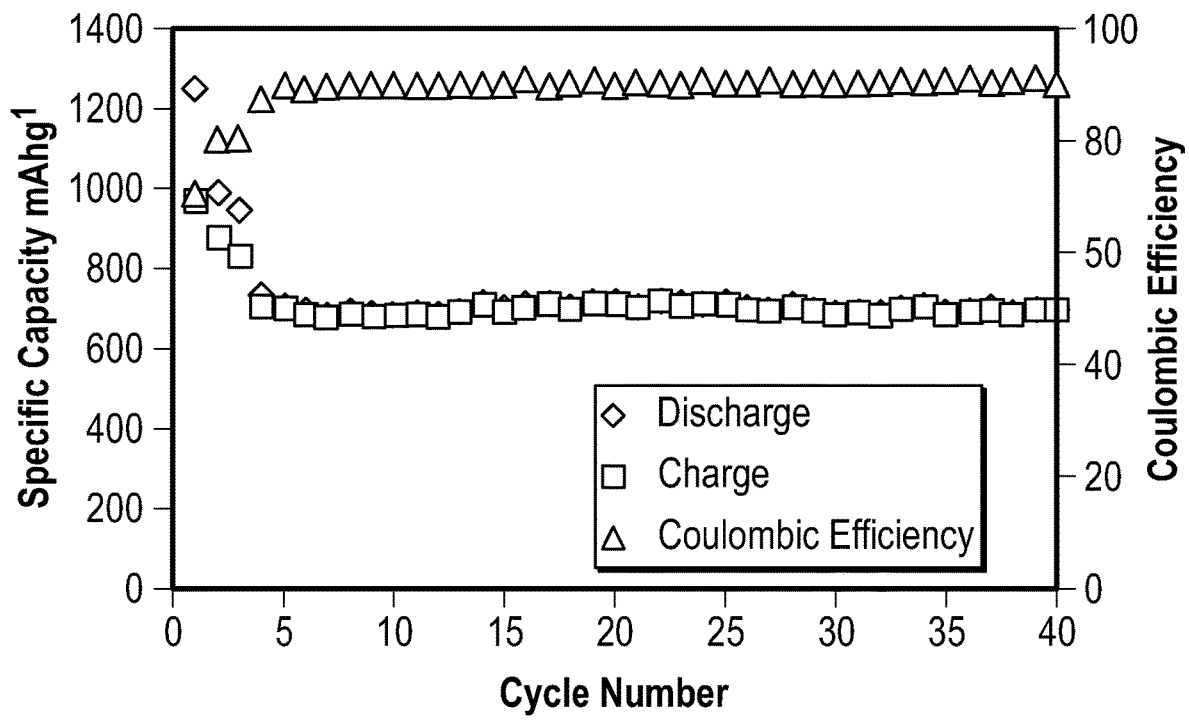
FIGS. 4A, 4B, and 4C show galvanostatic cycling data of a battery according to an example of the invention.
Figure 4B:
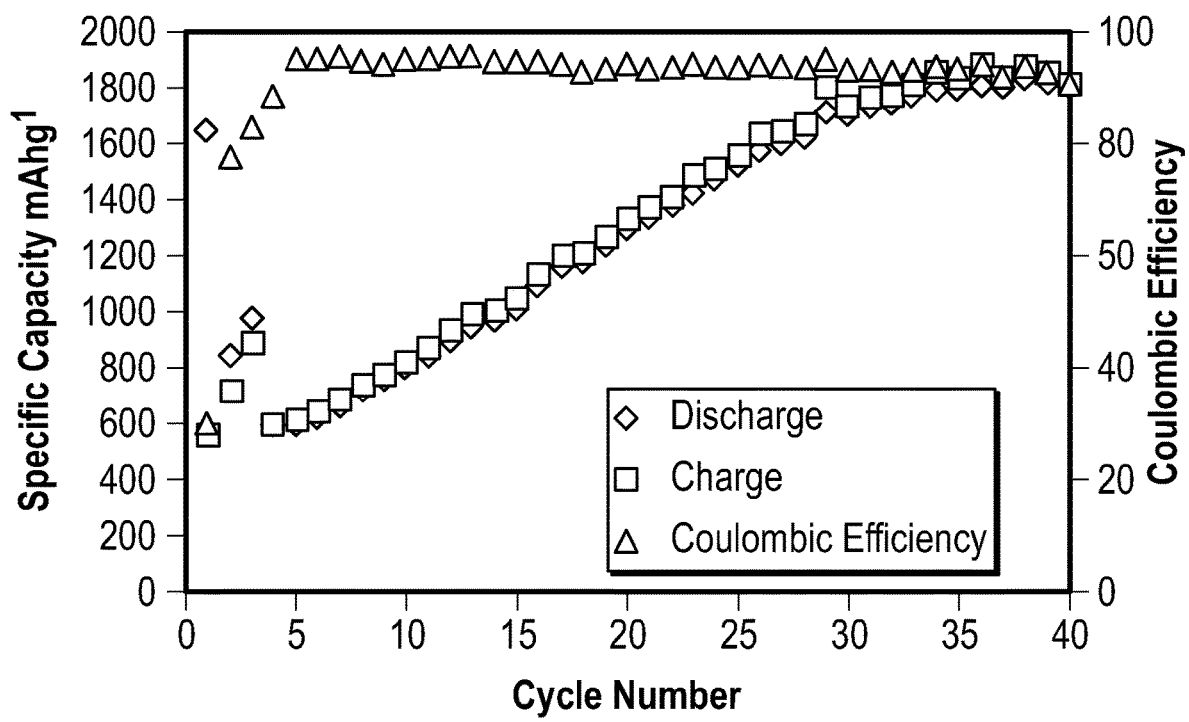
Figure 4C:
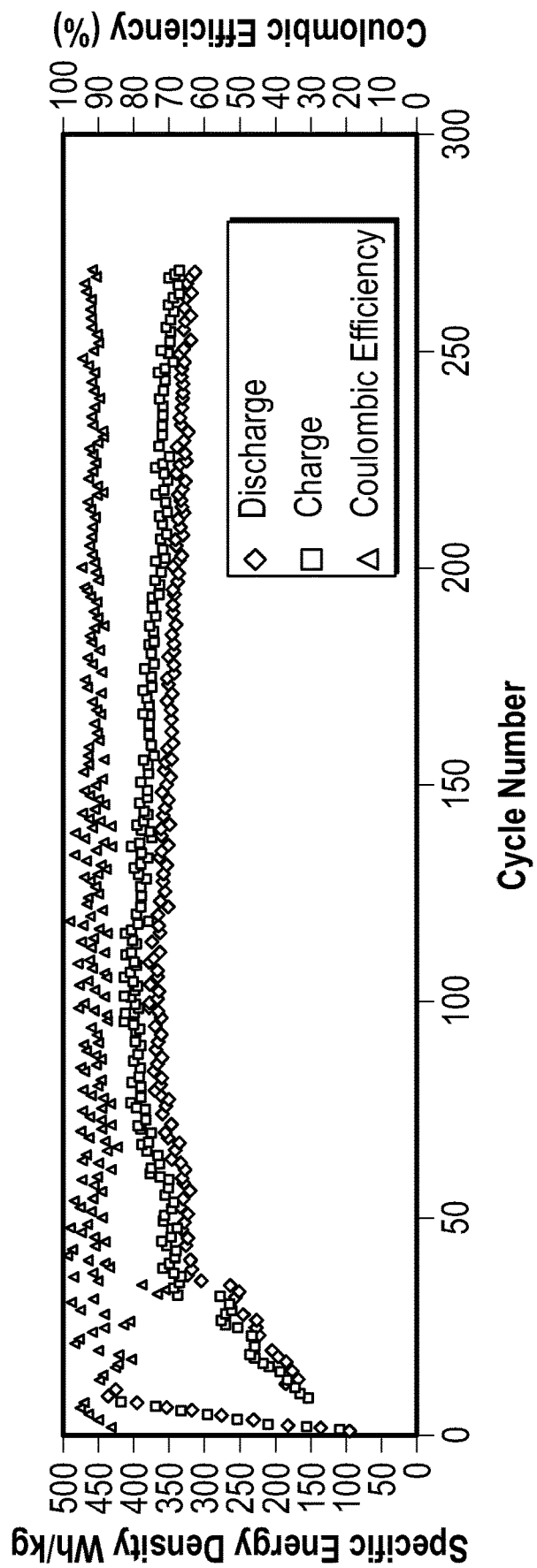

FIG. 2D shows the CV profile for the SSFC once it has reached equilibrium. The two cathodic peaks at 2.0 V and 2.3 V followed by an anodic peak at 2.5 V match the electrochemistry of the sulfur half-cell, FIG. 2A. This slight shift in peaks towards a higher potential represents further kinetic enhancement of the system. The difference in current range between FIG. 2C and FIG. 2D is attributed to a change in the peak current, alluding to a higher capacity and reactivity. This coincides with the increase in capacity as seen in FIG. 4C.

Figure 3A:
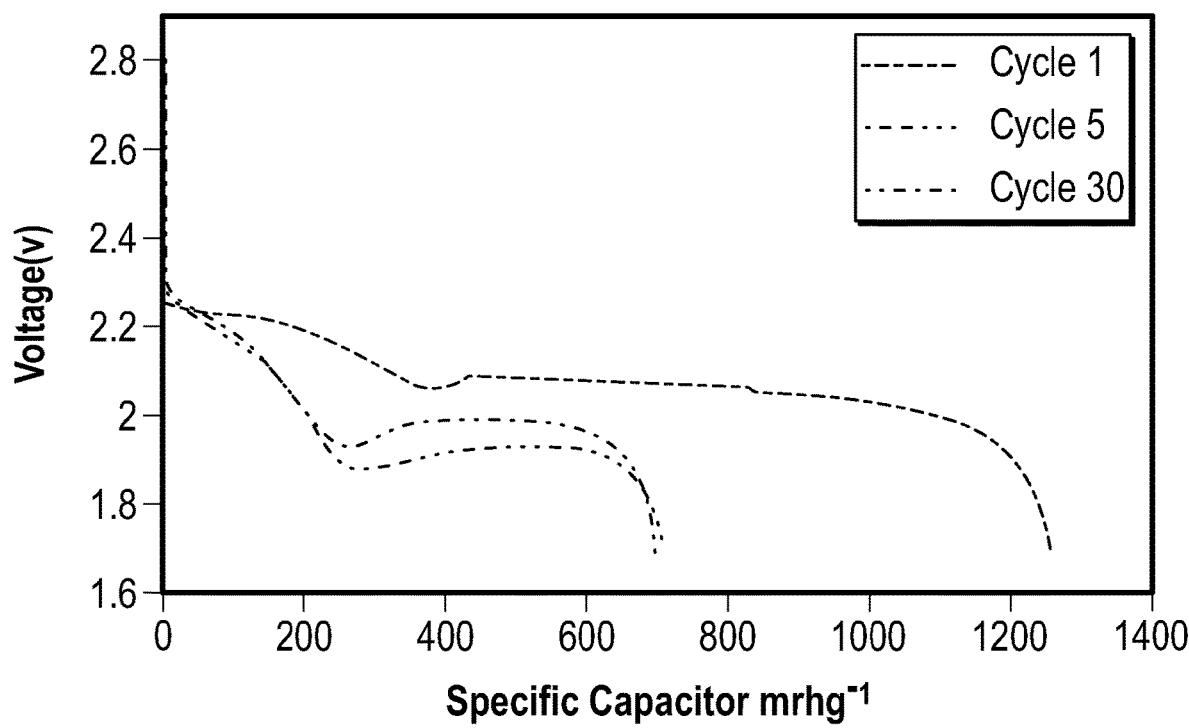
FIGS. 3A, 3B, and 3C show galvanostatic voltage data of a battery according to an example of the invention.
Figure 3B:
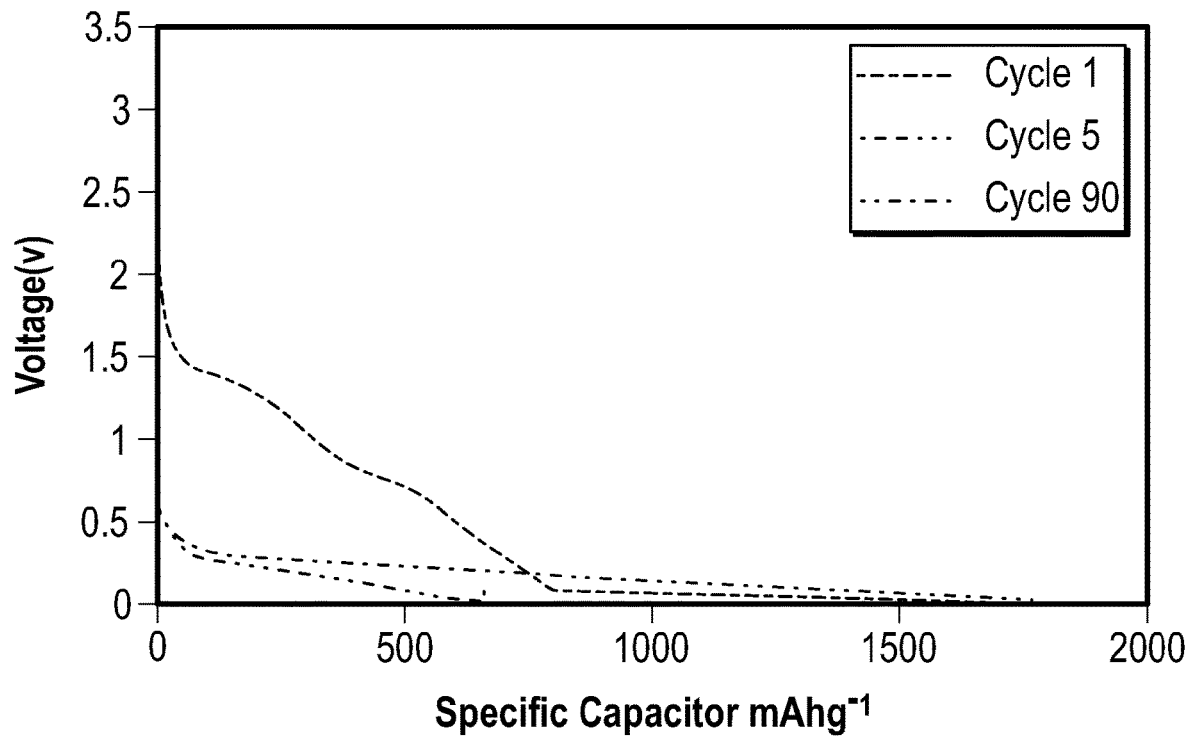

The charge-discharge profiles for the SSFC, sulfur and silicon cells are shown in FIG. 3. The potential of the sulfur half-cell during its first discharge in FIG. 3A exhibits two long plateaus at 2.3 V and 2.1 V. The first long plateau at 2.3 V is associated with long chain polysulfide formation($Li_2S_x$: x=8,6,4). The second plateau at 2.1 V corresponds to the formation of $Li_2S_2$ and $Li_2S$. After the first cycle, the plateau at 2.1 V shifts to 1.9 V, which concurs with the CV profile in FIG. 2A. The potential of the silicon half-cell during its first discharge in FIG. 3B exhibits a long plateau starting at 1.4 V. This corresponds to the formation of the solid electrolyte interphase. The voltage plateau at 1.4 V disappears after the first cycle, and is replaced with a plateau at 0.2 V. This is in accordance with the cathodic peak seen in FIG. 2B. The CV and discharge profiles for the sulfur and silicon half-cells are also consistent with data reported in literature.

Figure 3C:
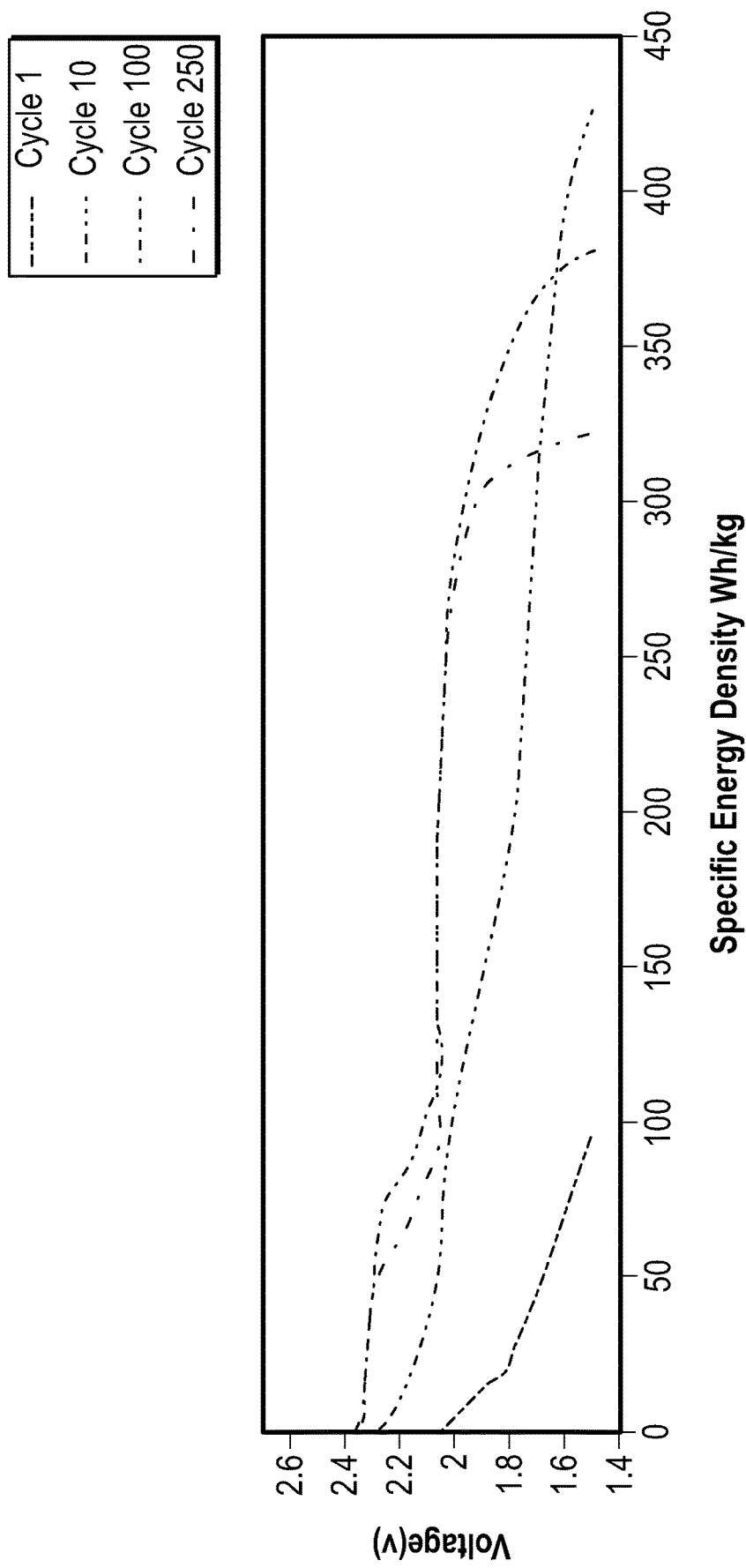

FIG. 3C shows the discharge profile for the SSFC. The first cycle has plateaus at 2 V and 1.8 V which concur with FIG. 2C. At cycle 2, an excess plateau at 1.8 V results from the aforementioned equilibrium potential between sulfur, silicon, and non-participating lithium. The voltage difference between the 10th and 100th cycles results from the cell conditioning and stabilizing by incorporating additional lithium over time. Once all the available lithium participates in the chemical reaction, as shown in cycle 100 and 250, the voltage profile of the SSFC is in accordance with the sulfur half-cell. This proves that a stabilized SSFC act similar to a conventional full cell.

Galvanostatic cycling of the sulfur and the silicon half-cell was carried out at a potential window of 1.7-2.8 V and 0.01-1 V respectively. In FIG. 4, the capacity for the batteries was measured at a rate of C/10 after being conditioned at C/50. In FIG. 4A, the sulfur half-cell has an initial capacity of 1254 $mAhg^{-1}$ and maintains a capacity of 700 $mAhg^{-1}$ for 40 cycles with a coulombic efficiency greater than 99%. The decrease in capacity is attributed to SEI formation, polysulfide shuttling, as well as mechanical degradation of the electrode. In FIG. 4B, the silicon half-cell has an initial capacity of 600 $mAhg^1$, and stabilizes at 1800 $mAhg^{-1}$ within 40 cycles with a coulombic efficiency greater than 99%. The increase in capacity is attributed to the calendared electrode, which limits the expansion of lithiated silicon and electrolyte penetration. This coincides with FIG. 2B, wherein the overall CV curve of the silicon half-cell increases in intensity over time, alluding to a higher capacity.

FIG. 4C shows galvanostatic cycling for the SSFC. The initial energy density of the SSFC is 100 Wh/kg at C/50 then increases to 414 Wh/kg over 10 cycles. The increase in energy density is attributed to the continuous integration of non-participating lithium, shown in FIG. 4C; this hypothesis is confirmed by FIGS. 2, 3, and 6. The SSFC has an energy density of 350 Wh/kg for over 250 cycles and a coulombic efficiency of approximately 95%. The fluctuation in coulombic efficiency from cycle 1 to 150 is due to the process of lithium integration. Lithium integration creates a unique chemical reaction in the SSFC. During the charge step in a conventional full-cell, lithium ions from the cathode reacts with the anode. However, in the SSFC, additional lithium ions from the chip react with silicon in the anode, increasing the charge capacity. The coulombic efficiency is calculated as discharge capacity divided by charge capacity. Hence, lithium ions from the chip lower the coulombic efficiency of cycles 1 to 150 despite the cathode operating with a coulombic efficiency of 99%, shown in FIG. 4A. By cycle 150 all the required lithium is incorporated in the SSFC and is actively participating in the redox reaction, however, excess lithium remains. During charge, lithium ions from the cathode plate onto the excess lithium chip while in parallel, lithium ions from the chip react with silicon which in turn lowers the coulombic efficiency to 95%. Additionally, the wave like fluctuations in capacity shown in FIGS. 5A, B, & C results from temperature changes occurring inside the testing room.

Electrochemical impedance spectroscopy, shown in FIG. 5, is a non-destructive method allowing us to investigate the integrity of electrode-electrolyte interface, passivation layers, electronic conductivity of electrode material, diffusion of lithium within electrode, and diffusion of lithium ions in electrolyte near electrode surface. Potentiostatic EIS is utilized to characterize the cells' complex impedance by measuring the current response to a small sinusoidal voltage signal. Impedance is obtained for a selected number of frequency points between the bounds of 10 kHz and 10 mHz.

Figure 5A:
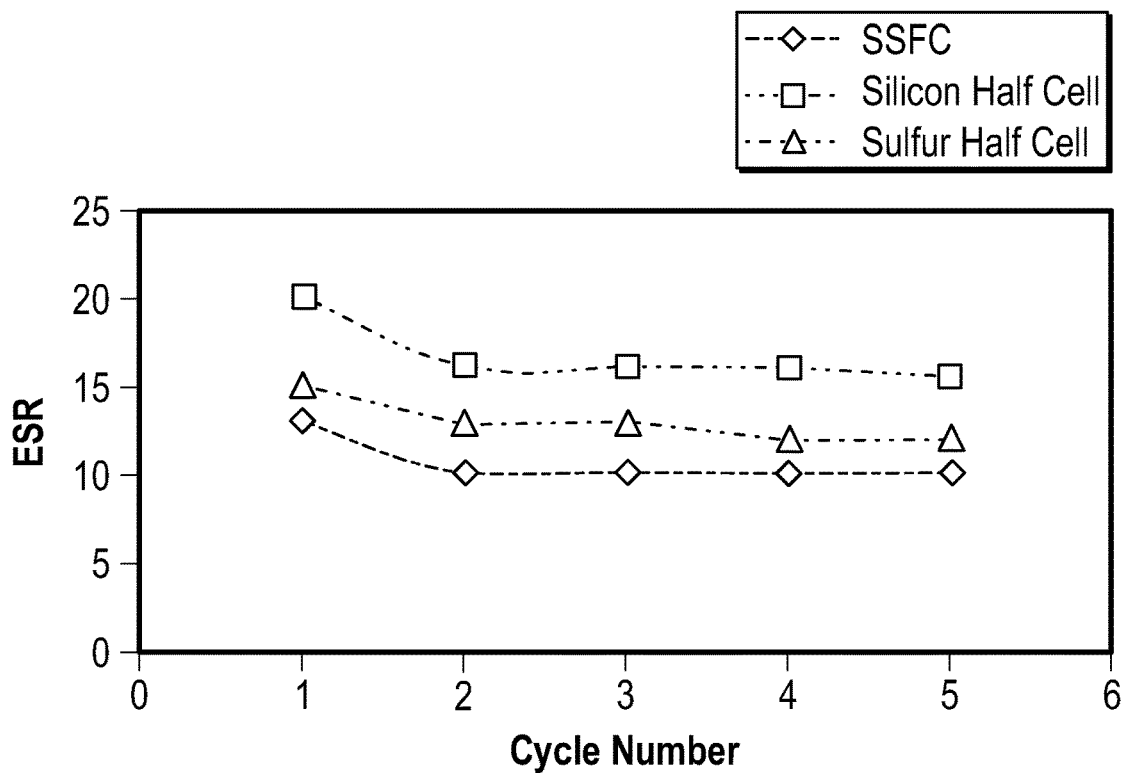
FIGS. 5A, 5B, 5C, 5D, and 5E show electrical test data of a battery according to an example of the invention.
Figure 5B:
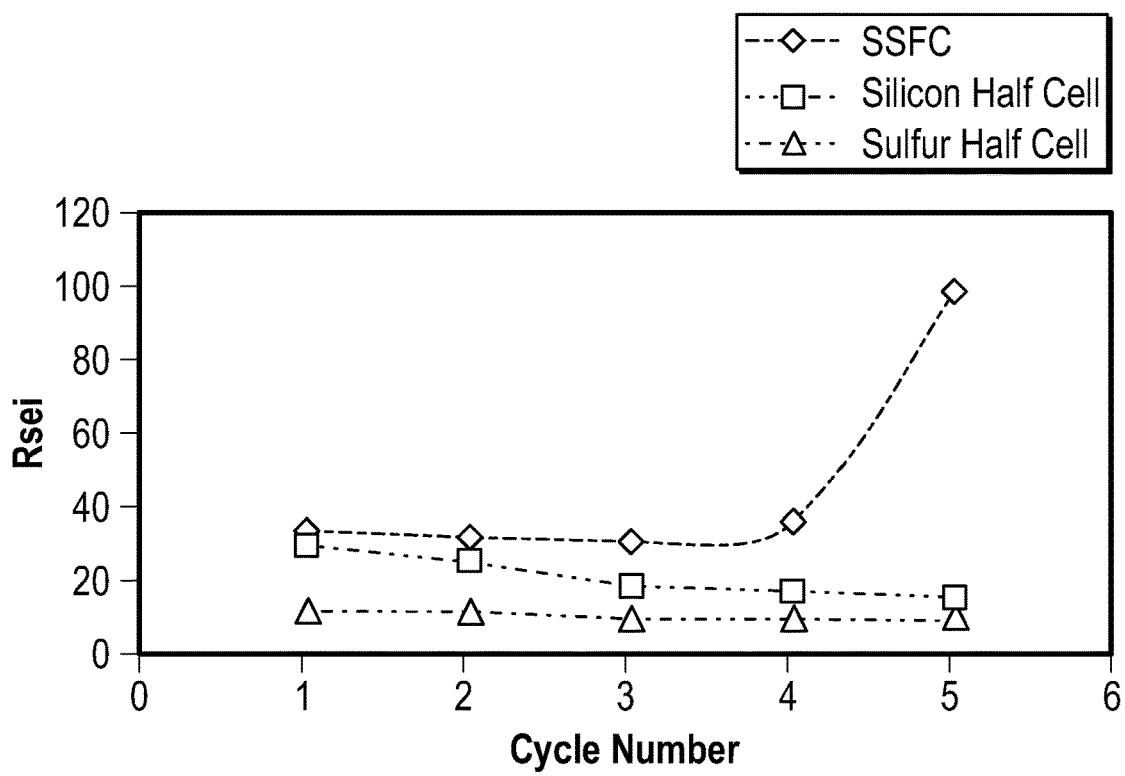
Figure 5C:
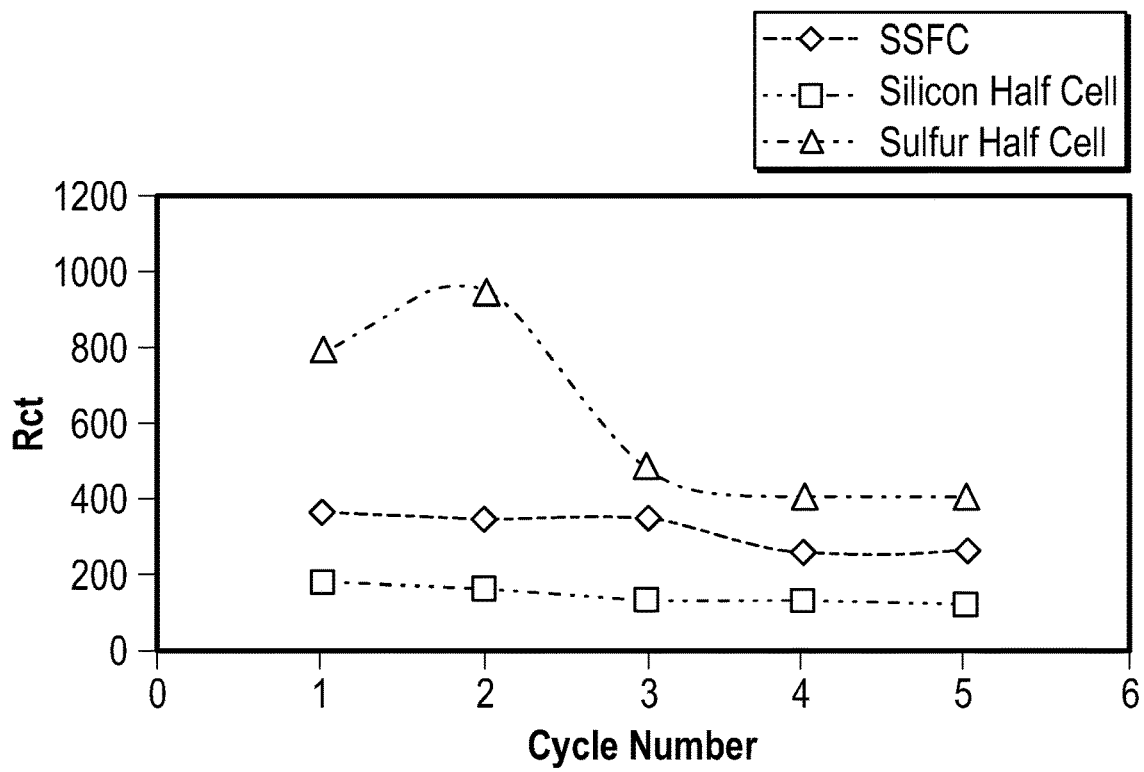
Figure 5D:
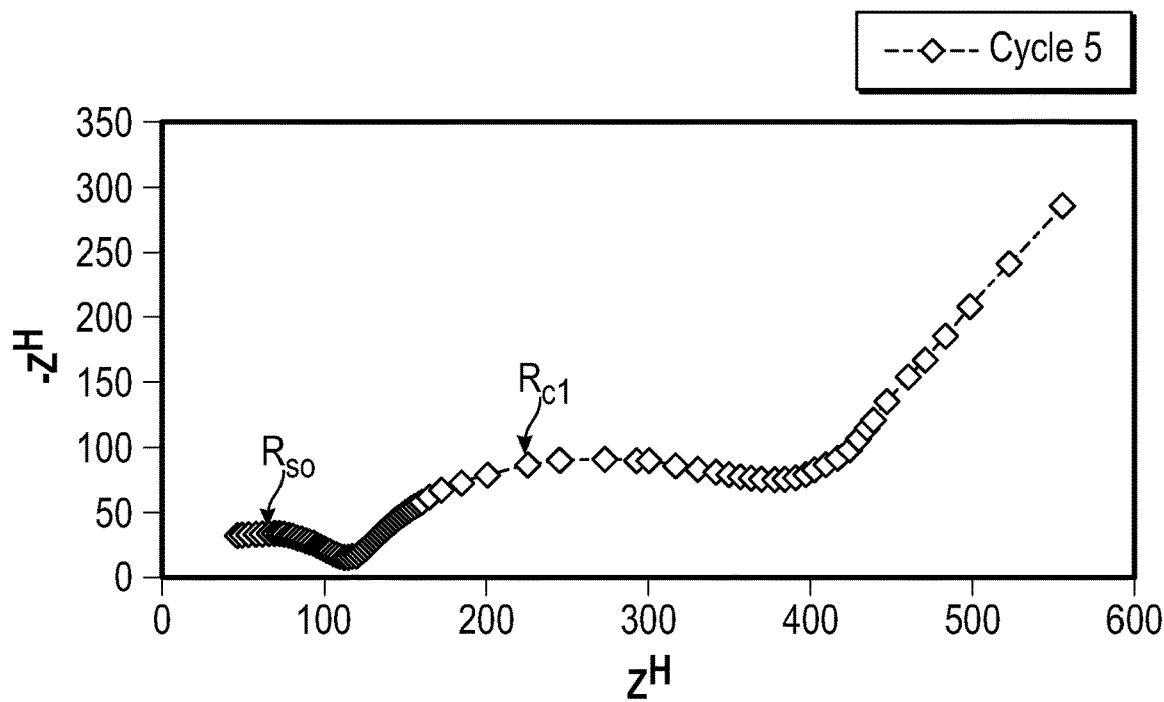
Figure 5E:
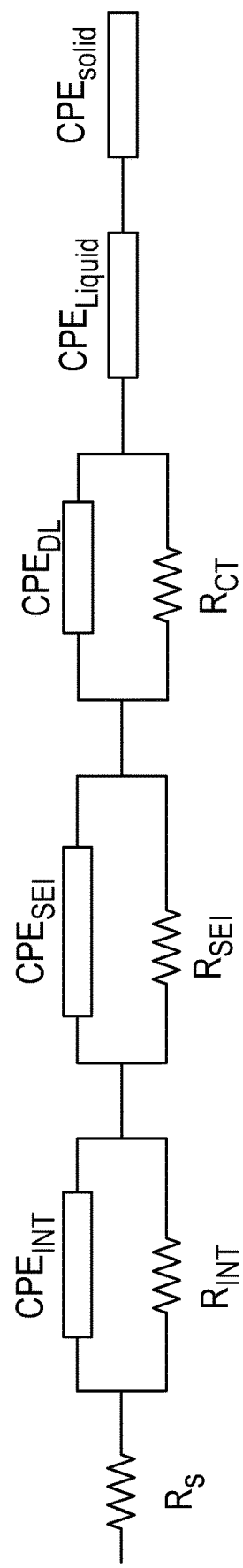

FIG. 5E shows the electrical equivalent circuit used to model the impedance of lithium-ion cells at a fully charged state. A fit between the impedance response of the circuit and that of the cell is obtained by tuning the circuit parameter values. The constant phase elements (CPE) present in the circuit are capacitances that are spatially non-uniform. Equation 1 gives the formula used to calculate the impedance of CPE. Here Q is analogue to capacitance, and n is an ideality factor that is constrained between 0 and 1, while an ideality factor of 1 is identical to an ideal capacitor.

$$Z_{CPE} = \frac{1}{Q(j\omega)^n} \quad (1)$$

In FIG. 5E, the value of equivalent series resistance (ESR) represents electrolyte conductivity. $R_{INT}$ quantizes electronic conductivity within electrode matrix, while $CPE_{INT}$ is a measure of the non-ideal capacitance that arises due to this finite conductivity. $CPE_{FILM}$ and $R_{FILM}$ quantize non-ideal capacitance and resistance associated with the passivating layers. $CPE_{DL}$ measures the nature of the Helmholtz double-layer formed about the electrode-electrolyte interface, while $R_{CT}$ determines the exchange current density. $R_{CT}$ is an indicator of how facile electron exchange kinetics are at the interface. $CPE_{LIQUID}$ quantizes diffusion of lithium ions in electrolyte near electrode surface. This diffusion impedance originates from the concentration gradient of lithium ions existing between the diffuse layer of charge and bulk electrolyte. $CPE_{SOLID}$ represents solid state diffusion of lithium atoms within the electrode material after lithiation and before delithiation.

FIG. 5A shows the evolution of ESR during initial cycling in the SSFC and the sulfur/silicon half-cells. ESR in all three cells show a stabilizing trend, which provides evidence of electrochemical durability. It is observed that the two half-cells show a larger ESR than the SSFC. A previous study has shown that electrolyte decomposition is worse in half-cells due to the presence of lithium-metal counter electrodes. FIG. 5C shows the change in $R_{CT}$ during the initial cycles in the same cells. It provides evidence for sulfur having slower kinetics than silicon. All three cells show a stabilizing trend over the initial cycles.

FIG. 5B shows how $R_{SEI}$ changes for the three cells within the same cycling window. Here we observe that the SSFC has the highest resistance value when compared to silicon and sulfur half-cells. We propose that the method we utilized to lithiate the full-cell assembly contributed to this observation. Lithium metal placed within the SSFC formed its own SEI during the initial cycling while the lithium content was slowly integrated into the anode. While the chip lost its lithium content to silicon anode, the SEI layer formed on top of it remained. Additionally, another SEI layer formed on the silicon anode as it participated in active lithiation/delithiation reactions. Thus, SSFC exhibits SEI impedance that originate from the silicon anode, from conductive carbon added in sulfur cathode, and from the lithium metal itself used to lithiate the full-cell. We also observe a spike in $R_{SEI}$ at the end of the 5th cycle. We hypothesize that this spike occurs due to the majority of SEI formation taking place on the silicon anode. We also observed that sulfur half-cell showed the lowest $R_{SEI}$ value among the three cells. This is so because sulfur does not natively form any permanent passivation film similar to SEI layers observed in silicon or carbon electrodes. SEI impedance observed in our sulfur electrodes originate from the carbon additive added to the electrode matrix as conductive agent.

GITT, shown in FIG. 6, was employed to investigate changes in lithium diffusivity within the individual battery systems. The batteries were subjected to current pulse intervals with a rate of C/50 for 10 minutes, followed by 10 minute rests until complete discharge/charge. In FIG. 6, the varying thickness of the voltage profiles represent varying lithium diffusivities in the system. Thinner voltage profiles indicate improved diffusivity while thicker voltage profiles represent the inverse.

Figure 6A:
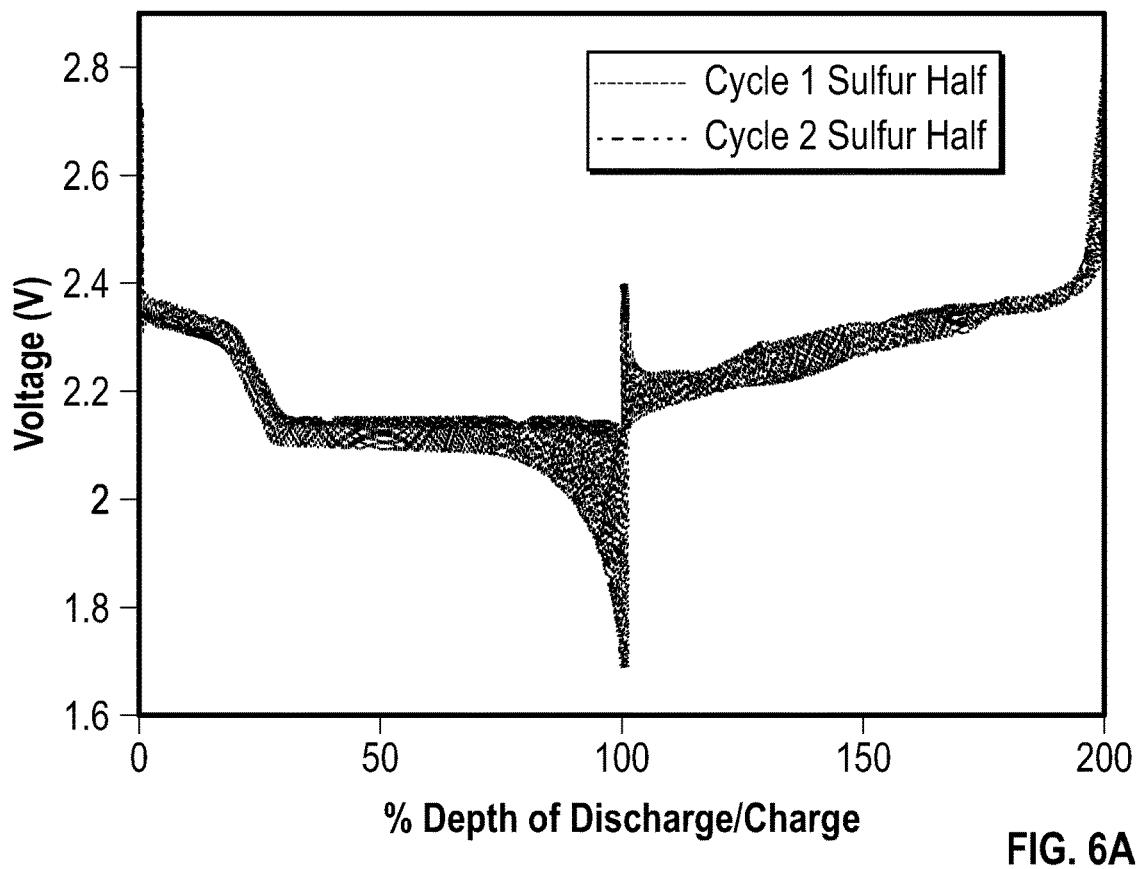
FIGS. 6A, 6B, 6C, and 6D show Galvanostatic Intermittent Titration Technique data of a battery according to an example of the invention.
Figure 6B:
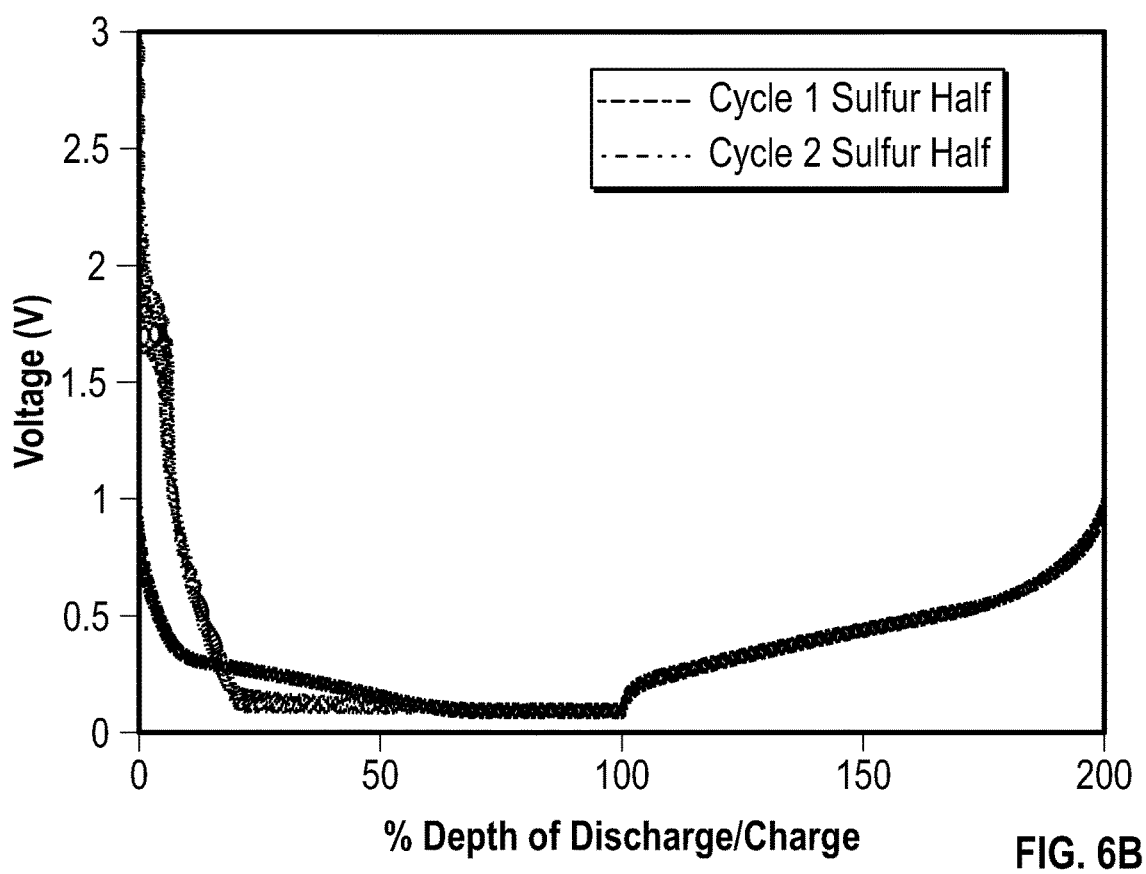

In FIG. 6A, the profile for the sulfur half-cell displays a slight decrease in voltage plateaus from cycles 1 to 2. This occurrence is also observed in FIG. 2A & 3A, and is attributed to the change in ionic and electric conductivity caused by the incremental SEI formation and polysulfide shuttling.[44] As seen in FIG. 6B, the silicon half-cell experiences a voltage shift within the first two cycles; this is attributed to SEI formation, coinciding with FIG. 3B. However, voltage profiles and diffusivity equilibrate by the second cycle, indicating that the silicon half-cell has faster kinetics than the sulfur half-cell as inferred by FIG. 5C. Hence, it is determined that the kinetics of sulfur half-cell is the limiting factor for the diffusivity of the SSFC.

Figure 6C:
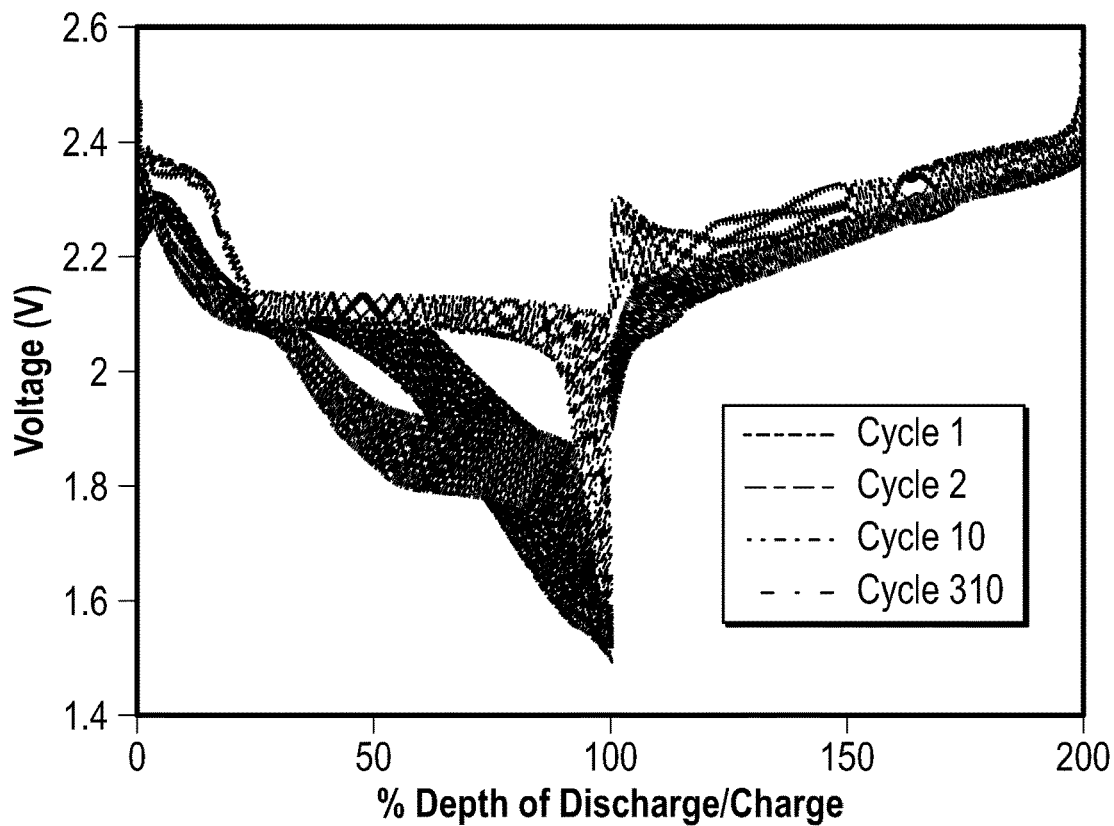

FIG. 6C shows the GITT profile for the SSFC. FIG. 6C depicts the voltage profiles of the SSFC resembling the sulfur half-cell, revealing plateaus at 2.3 V and 2.1 V after reaching equilibrium. However, the first cycle of the SSFC shows a discharge profile offset from the sulfur half-cell; this is attributed to limited lithium participation in the first cycle. Additionally, the second cycle shows a drastic shift in voltage profiles, also depicted in FIGS. 2C & 3C. The excess voltage plateau in cycle 2, at roughly 50% depth of discharge, alludes to the aforementioned issues associated with the architecture of the cell. The ionic and electric conductivity continue to improve from cycles 10 to 310 due to SEI formation and polysulfide shuttling. Hence, the diffusivity of the system improves, and we observe thinner voltage profiles in the subsequent cycles. The observable change in diffusion in cycle 2 to 10 is a result of total lithium utilization allowable in the system. Again, at this stage, the SSFC does not have access to the majority of required lithium. Hence, the cell requires subsequent cycles to integrate non-participating lithium into the anode.

Figure 6D:
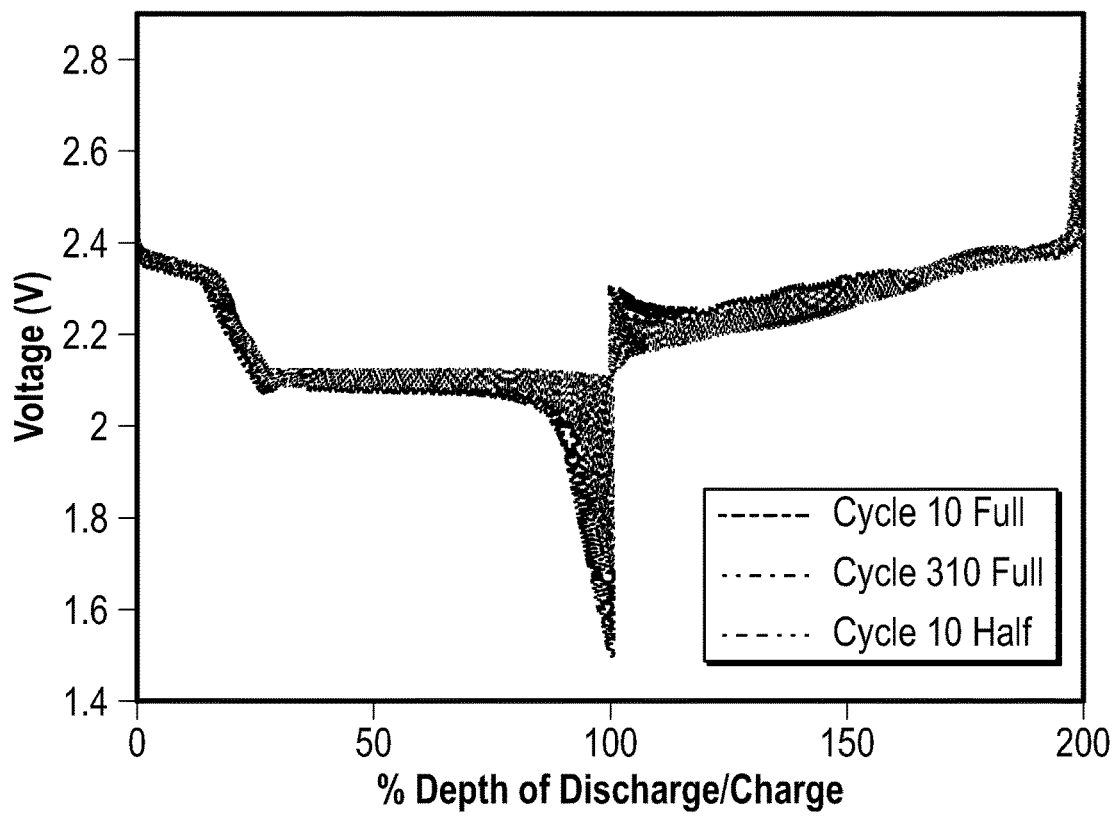

FIG. 6D compares the diffusivity of SSFC to the sulfur half-cell, wherein we see a notable difference within the early cycles. At 80-100% depth of discharge, the observable difference in diffusivity from the half-cell to SSFC is caused by the charge transfer resistance of the silicon anode. Similarly, once the cell starts to charge, the notable difference in diffusivity profiles at 0-20% depth of charge is a result of charge transfer resistance in the anode for the SSFC. Ultimately, FIG. 6D depicts the SSFC voltage profile continues to coincide with that of the half-cell once it has developed a complete utilization of lithium.

Herein, we have presented a simple alternative to prelithiated sulfur-silicon full cell systems utilizing a facile method for lithium placement. This method also allows for the control of lithium loading to compensate for SEI formation and lithium degradation. As a full cell configuration for next generation lithium ion batteries, the SSFC characterized by CV, GCPL, EIS, and GITT demonstrates an energy density of 350 Wh/kg over 250 cycles. Furthermore, this is the first time to the best of our knowledge a sulfur silicon full cell has been fully characterized using EIS, CV and GITT. The results presented here show that the sulfur silicon full cell is comparable to other prelithiation methods demonstrated in research and shows potential in industry applications.

The SSFCs consist of a sulfur cathode and a silicon anode. The sulfur cathode was made with 20 wt % Poly(acrylic acid) (PAA, 1800 g/mol, Sigma-Aldrich) and 80% wt % acetylene black sulfur composite(ABS). The aforementioned ABS was made by dissolving 200 mg of Sulfur (S, 99.998% trace metals basis, Sigma-Aldrich) in 20 ml of Dimethyl Sulfoxide (DMSO, Fisher Chemical) at 90 C, heated by a heating jacket (Brisk Heat). 129 mg of Acetylene black (Alfa aesar, 50% compressed) was then added to the solution, the solution was stirred for 3 hours before the heating jacket was removed and the solution was allowed to cool while stirring. The resulting ABS composite was then washed by anhydrous ethanol (Decon Labs, Inc.) several times to ensure the removal of DMSO and dried at 60C for 24 hours. To make the sulfur electrode, Poly(acrylic acid) (Sigma Aldrich, 450,000) and ABS were mixed with 1-Methyl-2-pyrrolidinone (NMP, Sigma-Aldrich) and then casted on a large piece of aluminum chip (Alfa Aesar, 0.025mm thickness, 99.45% purity) by a doctor blade (MTI Automatic Thick Film Coater, BYK Doctor Blade). The casted electrode sheet was then dried in a convection oven (Cole-Parmer, Stable Temp) at 60 C for 24 hours. The silicon electrode was made with 40 wt % of commercial silicon (GNM Silicon nanoparticles 80 nm), 25 wt % Acetylene black (Alfa aesar, 50% compressed), and 35 wt % Poly (acrylic acid) (Sigma Aldrich, 450,000). The materials were mixed and sonicated in ethanol and then casted on a large copper chip (Alfa Aesar, 0.025 mm thickness, 99.8% purity) with a doctor blade (BYK) and was then dried at 60 C for 24 hours. Both electrodes were calendared with a 0.04 mm calendar gap using a calendaring machine (IRM) before being constructed into a coin cell.

The morphology of the electrode pre and post cycling was observed by scanning electron microscopy (NovaNanoSEM 450). To make the SSFC battery, a silicon electrode (16 mm in diameter) was first put inside a negative cap (MTI type 2032 coin cell case) and a piece of lithium (MTI Lithium Chip 15.6 Dia×0.25 t mm) with corresponding weight (4-6 mg depending on electrode weight, with adjustments for SEI consumption) was adhered to the top of the silicon electrode inside an Ar filled glovebox ($H_2O$<0.5 ppm, O2<0.2 ppm, Vacuum Atmosphere Co.) to form a complete circuit. The amount of lithium needed was calculated based on the electrode weights and SEI lithium consumption of the half-cells. Next, separators (Celgard 25 um 3501) of various sizes were placed on top to prevent any possibility of shorting. Sulfur electrode (16mm in diameter) was then placed on top followed by two spacers, a spring, and the positive cap were added with the electrolyte in between (1:1 DOL:DME, 1 wt % $LiNO_3$, 1M LiTFSI). The battery was then sealed using a battery crimper (MTI, MSK-160D). The battery was tested under room temperature with a Bio Logic (BCS 810 Testing Module) using different testing methods, including Galvanostatic Cycling with Potential Limitation (GCPL), Cyclic Voltammetry (CV), Potentiostatic Electrochemical Impedance Spectroscopy (PEIS) and Galvanostatic Intermittent Titration Technique (GITT) in voltage window ranging from 1.5V to 2.6V. The same tests were also performed for the sulfur half-cell (between 1.7V to 2.8V) and the silicon half-cell (between 0.01V to 1V).

FIG. 1A. A) Novel battery architecture with lithium placed in circuit on-top of the silicon electrode.

FIG. 1B. A&B&C) Novel battery architecture with lithium placed in circuit on-top of the silicon electrode. D) Example of fully equilibrated full cell after conditioning steps.

FIG. 2. A) Cycles 1-10 for the sulfur electrode at a scan rate of 0.1 $mVs^{-1}$.B) Cycles 1-10 for the silicon electrode at a scan rate of 0.1 $mVs^{-1}$. C) CV of Cycles 1-2 for the SSFC at a scan rate of 0.05 $mVs^{-1}$. D) CV of Cycles 300-309 for the SSFC at a scan rate of 0.1 $mVs^{-1}$.

FIG. 3. A) Galvanostatic voltage profiles for the sulfur electrode at C/10 for selected cycles. B) Galvanostatic voltage profiles for the silicon electrode at C/10 for selected cycles. C) Galvanostatic voltage profiles for the SSFC at C/10 for selected cycles.

FIG. 4. A) Galvanostic cycling of the sulfur electrode at C/10 for 40 cycles. B) Galvanostic cycling of the silicon electrode at C/10 for 40 cycles.) Deep Galvanostic cycling of the SSFC at C/10 for more than 250 cycles.

FIG. 5. Impedance parameters during initial cycles for SSFC, silicon half-cell, and sulfur half-cell. A) ESR. B) $R_{CT}$. C) $R_{SEI}$. D) Experimental data SSFC cycle. 5 E) EEC used to obtain parameters.

FIG. 6. A) GITT analysis on the sulfur electrode at C/50 with 10 minutes rest for cycles 1-2. B).GITT analysis on the silicon electrode at C/50 with 10 minutes rest for cycles 1-2. C) GITT analysis on the SSFC at C/50 with 10 minutes rest for cycles 1, 2, 10, 310. D) GITT analysis comparing sulfur electrode at cycle 10 vs SSFC at cycles 10,310.

Figure 7:
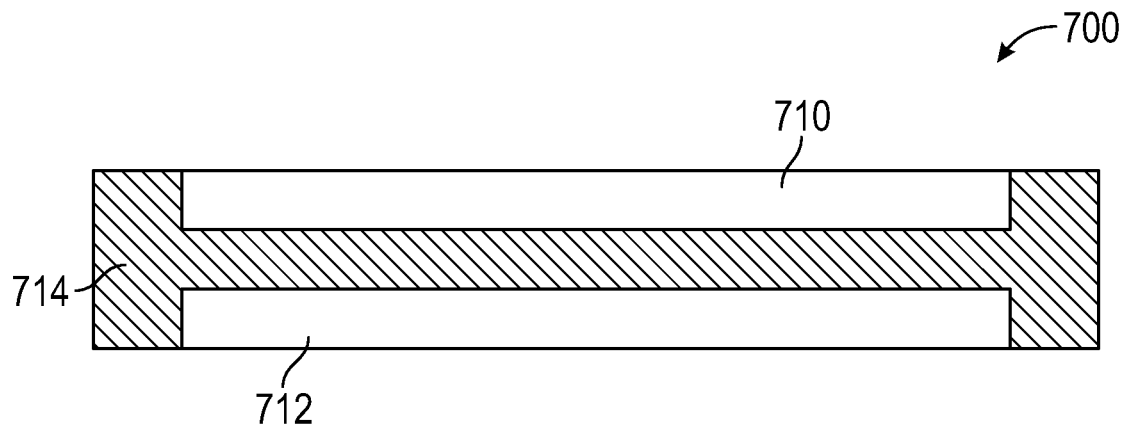
FIG. 7 shows a battery according to an example of the invention.

FIG. 7 shows an example of a battery 700 according to an embodiment of the invention. The battery 700 is shown including an anode 710 and a cathode 712. An electrolyte 714 is shown between the anode 710 and the cathode 712. In one example, the battery 700 is a lithium-ion battery. In one example, the anode 710 includes sulfur as described in examples above. In one example, the cathode 712 includes silicon as described in examples above. In one example, although the invention is not so limited, the battery 700 is formed to comply with a 2032 coin type form factor.

Figure 8:
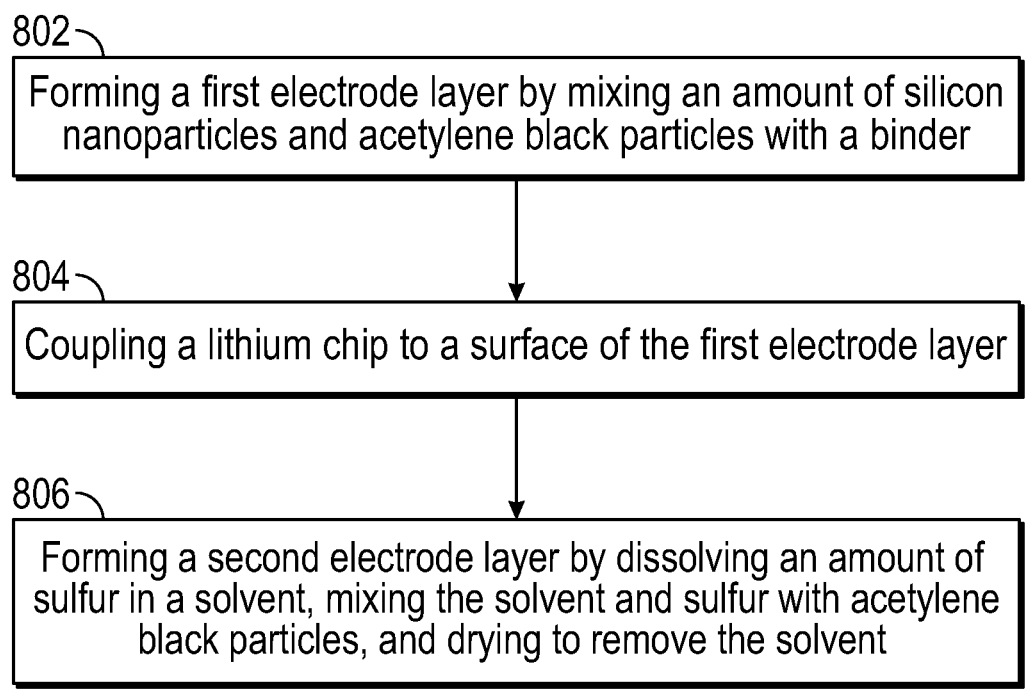
FIG. 8 shows a method of forming a battery according to an example of the invention.

FIG. 8 shows an example method of forming according to an embodiment of the invention. In operation 802 a first electrode layer is formed by mixing an amount of silicon nanoparticles and acetylene black particles with a binder. In operation 804, a lithium chip is coupled to a surface of the first electrode layer. In operation 806, a second electrode layer is formed by dissolving an amount of sulfur in a solvent, mixing the solvent and sulfur with acetylene black particles, and drying to remove the solvent.

To better illustrate the method and apparatuses disclosed herein, a non-limiting list of embodiments is provided here:

Example 1 includes a battery. The battery includes a first electrode, including a layer of silicon nanoparticles and a lithium chip coupled to a surface of the layer of silicon nanoparticles. The battery includes a second electrode including sulfur, and an electrolyte in contact with both the first electrode and the second electrode.

Example 2 includes the battery of Example 1, wherein the lithium chip is between the layer of silicon nanoparticles and the second electrode including sulfur.

Example 3 includes the battery of any one of Examples 1-2, wherein the lithium chip occupies only a fraction of a total surface area of the layer of silicon nanoparticles.

Example 4 includes the battery of any one of Examples 1-3, wherein the first electrode further includes an amount of acetylene black particles.

Example 5 includes the battery of any one of Examples 1-4, wherein the first electrode further includes a poly acrylic acid matrix.

Example 6 includes the battery of any one of Examples 1-5, wherein the first electrode includes 40 wt % silicon nanoparticles, 25 wt % acetylene black particles, and 35 wt % poly acrylic acid matrix.

Example 7 includes the battery of any one of Examples 1-6, further including a microporous polymer separator between the first electrode and the second electrode.

Example 8 includes the battery of any one of Examples 1-7, wherein the layer of silicon nanoparticles is layered on a copper substrate.

Example 9 includes the battery of any one of Examples 1-8, wherein the second electrode further includes an amount of acetylene black particles.

Example 10 includes the battery of any one of Examples 1-9, wherein the second electrode further includes a poly acrylic acid matrix.

Example 11 includes the battery of any one of Examples 1-10, wherein the second electrode including sulfur includes a sulfur containing layer on an aluminum substrate.

Example 12 includes a method of forming a battery, comprising forming a first electrode layer by mixing an amount of silicon nanoparticles and acetylene black particles with a binder, coupling a lithium chip to a surface of the first electrode layer, and forming a second electrode layer by dissolving an amount of sulfur in a solvent, mixing the solvent and sulfur with acetylene black particles, and drying to remove the solvent.

Example 13 includes the method of Example 12, further including spreading the first electrode layer on a copper substrate to form a first electrode.

Example 14 includes the method of any one of Examples 12-13, further including spreading the second electrode layer on an aluminum substrate to form a second electrode.

Example 15 includes the method of any one of Examples 12-14, further including electrochemically cycling the battery to integrate the lithium chip into a microstructure of the first electrode layer.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. However, the illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others skilled in the art to best utilize the various example embodiments with various modifications as are suited to the particular use contemplated.

It will also be understood that, although the terms "first," "second," and so forth may be used herein to describe various elements, these elements should not be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for the purpose of describing particular example embodiments only and is not intended to be limiting. As used in the description of the example embodiments and the appended examples, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A battery, comprising:
a first electrode, including:
a layer of silicon nanoparticles with a bottom surface in contact with a surface of a conductive substrate and a top surface opposite the bottom surface, wherein the layer of silicon nanoparticles includes an access opening to the conductive substrate through the layer of silicon nanoparticles from the top surface to the bottom surface;
a lithium chip in contact with the layer of silicon nanoparticles at the top surface, and in contact with the surface of the conductive substrate in the access opening, wherein the lithium chip includes a chip bottom surface that is larger than the access opening;
a second electrode including sulfur; and
an electrolyte in contact with both the first electrode and the second electrode.

2. The battery of claim 1, wherein the lithium chip is between the layer of silicon nanoparticles and the second electrode including sulfur.

3. The battery of claim 1, wherein the first electrode further includes an amount of acetylene black particles.

4. The battery of claim 3, wherein the first electrode further includes a poly acrylic acid matrix.

5. The battery of claim 4, wherein the first electrode includes 40 wt% silicon nanoparticles, 25 wt% acetylene black particles, and 35 wt% poly acrylic acid matrix.

6. The battery of claim 1, further including a microporous polymer separator between the first electrode and the second electrode.

7. The battery of claim 1, wherein the layer of silicon na.noparticles is layered on a copper substrate.

8. The battery of claim 5, wherein the second electrode further includes an amount of acetylene black particles.

9. The battery of claim 8, wherein the second electrode further includes a poly acrylic acid matrix.

10. The battery of claim 1, wherein the second electrode including sulfur includes a. sulfur containing layer on an aluminum substrate.

* * * * *